(12) United States Patent
Triebswetter et al.

(10) Patent No.: US 11,489,405 B2
(45) Date of Patent: Nov. 1, 2022

(54) GEAR SYSTEM

(71) Applicant: SEW-EURODRIVE GMBH & CO. KG, Bruchsal (DE)

(72) Inventors: Andreas Triebswetter, Bruchsal (DE); Marc Frey, Pforzheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 15/570,266

(22) PCT Filed: Mar. 2, 2016

(86) PCT No.: PCT/EP2016/000358
§ 371 (c)(1),
(2) Date: Oct. 27, 2017

(87) PCT Pub. No.: WO2016/173687
PCT Pub. Date: Nov. 3, 2016

(65) Prior Publication Data
US 2018/0123425 A1 May 3, 2018

(30) Foreign Application Priority Data

Apr. 28, 2015 (DE) ...................... 10 2015 005 360.4

(51) Int. Cl.
*H02K 7/102* (2006.01)
*F16D 65/18* (2006.01)
(Continued)

(52) U.S. Cl.
CPC ......... *H02K 7/1023* (2013.01); *F16D 65/186* (2013.01); *H02K 5/15* (2013.01); *H02K 7/116* (2013.01); *F16D 2121/22* (2013.01)

(58) Field of Classification Search
CPC ........ F16D 2121/20; H01F 7/121; H01F 7/08; B60T 8/4266; H02K 7/102; H02K 7/1025; H02K 9/06; H02K 7/10
(Continued)

(56) References Cited

U.S. PATENT DOCUMENTS 2,409,557 A * 10/1946 Gilfillan ............... H02K 49/043
192/13 R
2,420,553 A * 5/1947 Morrill ............... F16H 61/0202
475/154
(Continued)

FOREIGN PATENT DOCUMENTS

| CN | 1816704 A | 8/2006 |
|---|---|---|
| CN | 104053919 A | 9/2014 |

(Continued)

OTHER PUBLICATIONS

English translated version of DE 102008028604 A1 (Year: 2009).*
(Continued)

*Primary Examiner* — Robert A. Siconolfi
*Assistant Examiner* — Mahbubur Rashid
(74) *Attorney, Agent, or Firm* — Carter, DeLuca & Farrell LLP

(57) ABSTRACT

A gear system includes a gear unit and an electromagnetically actuable brake, the brake having a coil core that is connected to a brake surface part in a torsion-resistant manner. The brake surface part is connected to a bearing flange, its bearing mount in particular delimiting a free space. The bearing flange is connected to a cover part which is connected to a housing part of the gear unit, and a shaft is supported in the housing part via at least one bearing. A driver is connected to the shaft in a torsion-resistant manner, the driver having an external tooth system that is in engagement with an internal tooth system of a brake pad carrier
(Continued)

such that the brake pad carrier is connected to the shaft in a torsion-resistant yet axially displaceable manner. An armature disk, which is disposed in a torsion-resistant yet axially displaceable manner with respect to the coil core, is situated between the coil core and the brake pad carrier.

12 Claims, 1 Drawing Sheet

(51) Int. Cl.
  *H02K 5/15* (2006.01)
  *H02K 7/116* (2006.01)
  *F16D 121/22* (2012.01)
(58) Field of Classification Search
  USPC .......................................................... 188/161
  See application file for complete search history.

(56) References Cited

U.S. PATENT DOCUMENTS

| | | | | |
|---|---|---|---|---|
| 3,182,526 A * | 5/1965 | Zajac | B23Q 16/003 | 475/2 |
| 3,665,231 A * | 5/1972 | Wendler | F16D 65/54 | 310/77 |
| 3,670,549 A * | 6/1972 | Tselikov | B21B 21/005 | 72/208 |
| 4,049,089 A * | 9/1977 | Rundle | F16D 55/28 | 188/171 |
| 4,697,477 A * | 10/1987 | Barr | F16D 57/002 | 475/154 |
| 4,921,078 A * | 5/1990 | Sommer | F16D 59/02 | 188/171 |
| 4,938,321 A * | 7/1990 | Kelley | F16D 65/853 | 188/71.6 |
| 5,172,798 A * | 12/1992 | Mabee | F16D 67/06 | 192/84.91 |
| 5,242,039 A * | 9/1993 | Mabee | F16D 55/36 | 188/72.3 |
| 5,360,091 A * | 11/1994 | Sommer | F16D 67/06 | 192/18 B |
| 5,487,458 A * | 1/1996 | Sommer | F16D 67/02 | 192/18 B |
| 5,489,068 A * | 2/1996 | Vischiani | D03D 47/361 | 139/452 |
| 5,533,425 A * | 7/1996 | Mabee | F16D 67/06 | 74/661 |
| 5,631,511 A * | 5/1997 | Schulmann | C30B 15/30 | 117/13 |
| 5,778,703 A * | 7/1998 | Imai | D06F 37/40 | 68/12.02 |
| 6,125,975 A * | 10/2000 | Seeto | B60T 13/746 | 188/171 |
| 6,322,298 B1 * | 11/2001 | Wada | B23G 1/16 | 408/127 |
| 6,328,655 B1 * | 12/2001 | Zimmermann | F16H 57/025 | 464/170 |
| 6,333,577 B1 * | 12/2001 | Kusumoto | H02K 7/10 | 310/102 R |
| 6,425,838 B1 * | 7/2002 | Matsubara | F02B 63/04 | 475/5 |
| 6,459,182 B1 * | 10/2002 | Pfann | H02K 7/1025 | 188/161 |
| 6,951,269 B2 * | 10/2005 | Schneider | F16D 67/06 | 192/48.91 |
| 7,143,884 B2 * | 12/2006 | Keener | F16D 25/0638 | 192/85.53 |
| 8,397,883 B2 * | 3/2013 | St. Clair | F16D 57/002 | 188/161 |
| 8,746,421 B2 * | 6/2014 | Tarhan | H02K 7/1025 | 188/171 |
| 9,112,388 B2 * | 8/2015 | Imai | F16D 59/02 | |
| 2005/0029883 A1 * | 2/2005 | Gauthier | H02K 7/1016 | 310/91 |
| 2007/0107998 A1 | 5/2007 | Vogt et al. | | |
| 2008/0067960 A1 * | 3/2008 | Maeda | B62D 5/046 | 318/400.02 |
| 2009/0308827 A1 * | 12/2009 | Philippon | B66C 23/88 | 212/294 |
| 2012/0229127 A1 * | 9/2012 | Koto | G01D 5/145 | 324/207.25 |
| 2014/0332172 A1 * | 11/2014 | Hsieh | E06B 9/84 | 160/133 |
| 2017/0248185 A1 * | 8/2017 | Isono | F16D 65/186 | |

FOREIGN PATENT DOCUMENTS

| | | |
|---|---|---|
| DE | 196 14 945 A1 | 10/1997 |
| DE | 20303060 U1 | 7/2004 |
| DE | 103 14 697 A1 | 10/2004 |
| DE | 10 2008 028 604 A1 | 12/2009 |
| EP | 0 925 631 A1 | 6/1999 |
| EP | 1 452 764 A1 | 9/2004 |
| WO | 2005/017384 A1 | 2/2005 |

OTHER PUBLICATIONS

International Preliminary Report on Patentability, dated Oct. 31, 2017, in International Application No. PCT/EP2016/000358. (English-language translation).
International Serach Report dated May 27, 2016, in International Application No. PCT/EP2016/000358. (English-language translation).

* cited by examiner

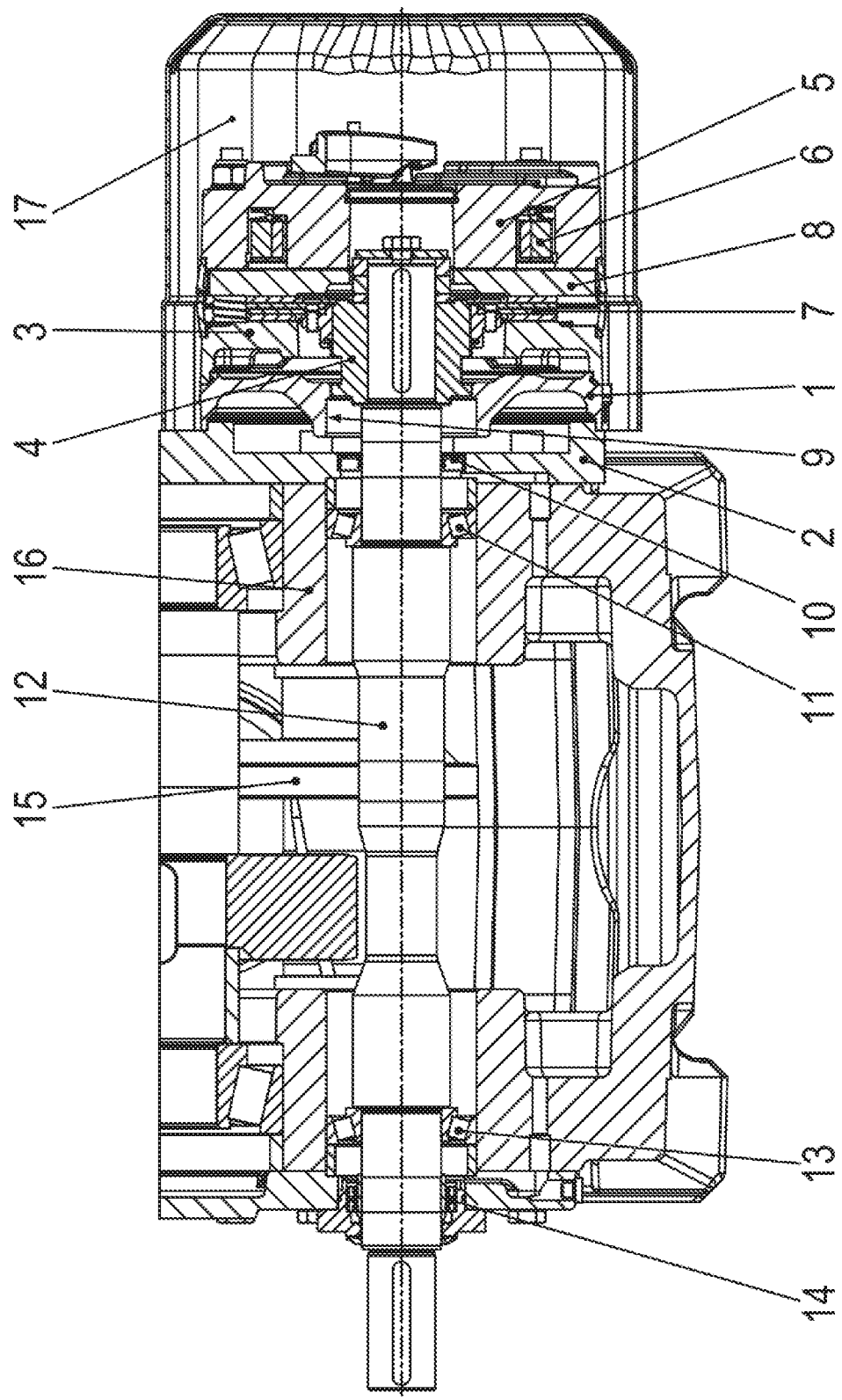

GEAR SYSTEM

FIELD OF THE INVENTION

The present invention relates to a gear system.

BACKGROUND INFORMATION

It is generally known that an electric motor may be arranged as a brake motor.

SUMMARY

Example embodiments of the present invention provide a gear system, for which the most compact design possible is to be achieved.

According to an example embodiment of the present invention, a gear system includes a gear unit and an electromagnetically actuable brake. The brake has a coil core, which is connected to a brake surface part in a torsion-resistant manner. The brake surface part is connected to a bearing flange, whose bearing mount delimits a free space, in particular. The bearing flange is connected to a cover part, which is connected to a housing part of the gear unit. A shaft is supported via at least one bearing in the housing part, and a driver is connected to the shaft in a torsion-resistant manner, the driver having an external tooth system that is in engagement with an internal tooth system of a brake pad carrier such that the brake pad carrier is connected to the shaft in a torsion-resistant but axially displaceable manner. An armature disk is situated between the coil core and the brake pad carrier, the armature disk being disposed in a torsion-resistant yet axially displaceable manner with respect to the coil core.

This has the advantage that the input shaft of the gear unit is connected to the brake. As a result, the motor to be connected and driving the shaft simply needs to be connected to the shaft without having to be arranged as a brake motor. In other words, the brake is always available at the gear unit. In particular, the brake is arranged as a stop brake so that that the input shaft is already fixed in place by the brake during the assembly. This allows for a particularly uncomplicated assembly of the motor with the gear unit.

The coil core may include an annular recess inside which the coil winding is accommodated, thereby offering the advantage of an uncomplicated assembly. In addition, the coil core may be produced from a ferromagnetic steel cast.

The brake surface part may be centered on the bearing flange. This is considered advantageous inasmuch as a precise and uncomplicated alignment of the brake surface part is possible.

The bearing flange may be centered on the cover part, and the cover part may be centered on the housing part. This has the advantage that a precise assembly is able to be carried out.

A spring element, which is braced on the coil core, may apply a spring force to the armature disk, which is considered advantageous inasmuch as the brake engages in the non-energized state and is consequently implemented as a stop brake.

The cover part may accommodate a shaft sealing ring provided on the shaft. This is considered advantageous in that it allows the interior of the gear unit to be filled with lubricating oil and that the gear unit is sealed from the environment and the brake.

A dome component that surrounds the brake, especially the coil core, the armature disk as well as the brake pad carrier, may be connected to the bearing flange by a screwed connection. This has the advantage of providing a contact guard, and the bearing flange holds and carries the dome component.

A cable bushing for the electrical lines for the supply of the coil winding may be disposed on the bearing flange. In this manner, the lines may be routed to the outside in a protected manner.

The dome component may include a recess for feeding the electrical lines through the wall of the dome component. This has the advantage that the supply lines of the brake may be routed out through the dome component.

The shaft may project from the housing part on both sides, it being possible, in particular, to provide an electric motor for the introduction of torque at the first end of the shaft while the brake is situated at the other end. This is considered advantageous inasmuch as the brake is connected to the gear unit so that when the driving electric motor is connected to the gear unit, i.e. when the rotor shaft of the electric motor is connected to the input shaft of the gear unit and the housing of the electric motor is connected to the housing, especially the housing part of the gear unit, the brake fixes the input shaft in place because the brake is implemented as a stop brake.

The cover part may have an axially directed depression into which the bearing flange partially projects, the axial region covered by the depression in particular overlapping the axial region covered by the bearing flange, and in particular, a non-vanishing clearance existing in the radial clearance region covered by the depression between bearing flange and cover part.

This is considered advantageous inasmuch as the region of the bearing mount of the bearing flange projects into the region of the depression. As a result, the axial region covered by the depression overlaps the axial region covered by the bearing mount, thereby resulting in a very compact configuration.

The bearing mount is suitable for accommodating an antifriction bearing, in particular a ball bearing, i.e. an outer ring of the antifriction bearing.

Example embodiments of the present invention are described in greater detail below with reference to the FIGURE.

BRIEF DESCRIPTION OF THE DRAWING

FIG. 1 shows a cross-sectional view through a gear unit according to an example embodiment of the present invention, which includes an electromagnetically actuable brake.

DETAILED DESCRIPTION

As illustrated in FIG. 1, the gear unit has an input shaft 12 to which a toothed part 15 is connected in a torsion-resistant manner; toothed part 15 is in engagement with a further toothed part that is connected to another shaft of the gear unit in a torsion-resistant manner.

The shaft is supported in a housing part 16 with the aid of bearings 13 and 11. Shaft sealing rings 14 and 10 are disposed axially outside of bearings 13 and 11 so that the interior of the gear unit, which is filled with lubricating oil, is sealed from the external environment.

Through a recess in housing part 16, shaft 12 emerges in the direction of the brake. This exit region 2 is surrounded by a cover part 2, which is centered on housing part 16 with the aid of a fitted ring, and has a recess in which shaft sealing ring 10 is situated. Shaft sealing ring 10 is accommodated in cover part 2 and is provided on shaft 12.

Using a feather-key connection, a driver 4 is connected to shaft 12 in a torsion-resistant manner. Driver 4 has on its radial external side a tooth system that extends in an axial direction. An internal tooth system of brake pad carrier 7 is in engagement with this tooth system so that the brake pad carrier is connected to shaft 12 in a torsion-resistant yet axially displaceable manner.

A bearing flange 1 is connected to cover part 2. However, bearing flange 1 does not accommodate a bearing but has a free bearing mount 9. A free space therefore exists in the radial region between bearing flange 1 and shaft 12 covered by this bearing mount 9.

A brake surface part 3 is connected to bearing flange 1 so that bearing flange 1 is situated between brake surface part 3 and cover part 2.

Brake-surface part 3 has a brake surface that points in the direction of brake pad carrier 7. Disposed on the side facing away from brake pad carrier 7 is an armature disk 8, which is connected to a coil core 5 in a torsion-resistant yet axially displaceable manner; coil core 5 is connected to brake surface part 3 in a torsion-resistant manner, and thus is also connected to cover part 2 and bearing flange 1 as well as to housing part 16.

Axially directed bolts are connected to coil core 5 and are also connected to brake surface part 3. These bolts extend through recesses of armature disk 8 and thus act as axial guides.

An annular recess is situated in coil core 5, the ring axis being aligned coaxially with the axis of shaft 12. A coil winding 6 is accommodated in the annular recess.

When current is supplied to coil winding 6, armature disk 8 is attracted toward coil core 5, counter to the spring force generated by spring elements, the spring elements being braced on coil core 5. The brake is therefore ventilated.

When no current is supplied to coil winding 6, the spring elements press armature disk 8 onto brake pad carrier 7, which in turn is pressed onto the brake surface provided on the brake surface part. Since the brake pad carrier has brake pads axially on both sides, a friction force is induced as a result, and the brake, thereby engaged, brakes shaft 12.

Bearing flange 1 has a centering collar by which it is centered on cover part 2. Brake surface part 3 is likewise centered on bearing flange 1.

A dome component 17 is slipped onto bearing flange 1, i.e. placed on top. Dome component 17 is screwed to bearing flange 1.

Bearing flange 1 may be used for an electric motor, so that a bearing for supporting the motor shaft is then able to be accommodated at bearing mount 9.

Dome component 17 includes a depression into which bearing flange 1 projects at least partially. The axial region covered by the depression therefore overlaps the axial region covered by bearing flange 1.

In addition, a cable bushing for the supply lines of coil winding 6 is provided in bearing flange 1. The supply lines to coil winding 6 are guided through bearing flange 1 with the aid of the cable bushing and from there, through a recess in dome component 17, out to the environment.

It may be provided that shaft 12 is situated so as to project from housing part 12 on both sides. As a result, a driving electric motor may be placed on the side of the housing part that faces away from the brake. There is consequently no need to use a brake motor, but the input shaft of the gear unit must be routed out on both sides.

LIST OF REFERENCE NUMERALS 1 bearing flange
2 cover part
3 brake surface part
4 driver
5 coil core
6 coil winding
7 brake pad carrier
8 armature disk
9 bearing mount
10 shaft sealing ring
11 bearing
12 shaft, in particular an input shaft
13 bearing
14 shaft sealing ring
15 toothed wheel
16 housing part
17 dome component

The invention claimed is:

1. A gear system, comprising:
a gear unit; and
an electromagnetically actuable brake, including a coil core connected to a brake surface part in a torsion-resistant manner;
wherein the brake surface part is connected to a flange, the flange is connected to a cover part, which is connected to a housing part of the gear unit;
wherein a shaft is supported in the housing part via a first bearing provided at a first end region of the housing part and a second bearing provided at an opposite second end region of the housing part;
wherein a driver is connected to the shaft in a torsion-resistant manner, the driver having an external tooth system in engagement with an internal tooth system of a brake pad carrier such that the brake pad carrier is connected to the shaft in a torsion-resistant yet axially displaceable manner; and
wherein an armature disk, which is disposed in a torsion-resistant yet axially displaceable manner with respect to the coil core, is situated between the coil core and the brake pad carrier;
wherein the flange includes a cylindrical recess having an axial length, the shaft extending through the cylindrical recess, a space region being delimited by an inner circumferential wall of the cylindrical recess and an outer surface of the shaft along the entire axial length of the cylindrical recess;
wherein no structure is contained within the space region; and
wherein the cover part accommodates a shaft sealing ring provided on the shaft.

2. The gear system according to claim 1, wherein the coil core has an annular recess in which a coil winding is accommodated.

3. The gear system according to claim 1, wherein the brake surface part is centered on the flange.

4. The gear system according to claim 1, wherein the flange is centered on the cover part and the cover part is centered on the housing part.

5. The gear system according to claim 1, wherein a spring element, which is braced on the coil core, applies a spring force to the armature disk.

6. The gear system according to claim 1, wherein a dome component, which surrounds the brake and/or the coil core, the armature disk, and the brake pad carrier, is connected to the flange by screws.

7. The gear system according to claim 6, wherein the dome component has a recess for feedthrough of electrical lines through a wall of the dome component.

8. The gear system according to claim 1, wherein a cable bushing for electrical lines for supplying coil winding is disposed on the flange.

9. The gear system according to claim 1, wherein the shaft projects from the housing part on both sides.

10. The gear system according to claim 9, wherein an electric motor is provided at a first end of the shaft to introduce a torque, and the electromagnetically actuable brake is situated at a second end of the shaft.

11. The gear system according to claim 1, wherein the cover part has an axially directed depression into which the flange partially projects, an axial region covered by the depression overlapping an axial region covered by the flange, and a non-vanishing distance exists in a radial clearance region covered by the depression between the flange and the cover part.

12. The gear system according to claim 11, wherein the axial region covered by the depression in the cover part overlaps the axial region covered by the bearing mount provided on the flange.

\* \* \* \* \*